United States Patent [19]
Floyd et al.

[11] Patent Number: 6,002,507
[45] Date of Patent: Dec. 14, 1999

[54] METHOD AND APPARATUS FOR AN INTEGRATED LASER BEAM SCANNER

[75] Inventors: Philip D. Floyd; Decai Sun, both of Sunnyvale, Calif.; Joel A. Kubby, Rochester, N.Y.

[73] Assignee: Xerox Corpoation, Stamford, Conn.

[21] Appl. No.: 09/201,738

[22] Filed: Dec. 1, 1998

[51] Int. Cl.$^6$ .................................................. G02B 26/08
[52] U.S. Cl. ........................... 359/201; 359/850; 359/224
[58] Field of Search .................................. 359/198, 201, 359/202, 212, 213, 214, 220, 221, 223, 224, 225; 250/230, 234

[56] References Cited

U.S. PATENT DOCUMENTS

| | | | |
|---|---|---|---|
| 5,629,790 | 5/1997 | Neukermans et al. ................... | 359/198 |
| 5,742,419 | 4/1998 | Dickensheets ........................... | 359/201 |

OTHER PUBLICATIONS

Daneman, M.J.; Solgaard, O.; Tien, N.C.; Lau, K.Y.; Muller, R.S. "Laser–to–Fiber Coupling Module Using a Micromachined Alignment Mirror." *IEEE Photonics Technology Letters*, vol. 8, No. 3, Mar. 1996, pp. 396–398.

Judy, J.W.; Muller, R.S. "Batch–Fabricated, Addressable, Magnetically Actuated Microstructures." *Solid–State Sensor* and *Actuator Workshop*, Hilton Head, South Carolina, Jun. 2–6, 1996, pp. 187–190.

Lin, L.Y.; Lee, S.S.; Pister, K.S.J.; Wu, M.C. "Self–aligned hybrid integration of semiconductor lasers with micromachined micro–optics for optoelectronic packaging." *Appl. Phys. Lett.* 66 (22), May 29, 1995, ©1995 American Institute of Physics, pp. 2946–2948.

*Primary Examiner*—Cassandra Spyrou
*Assistant Examiner*—Leo Boutsikaris

[57] ABSTRACT

A solid state laser beam scanning system having a single crystal silicon deflection and scanning mirror integrated with a laser diode. By combining the techniques of deep reactive ion etching of silicon with solder bump bonding techniques, completed and tested laser diodes are integrated with silicon substrates supporting micro-electro-mechanical systems layers.

20 Claims, 11 Drawing Sheets

METHOD AND APPARATUS FOR AN INTEGRATED LASER BEAM SCANNER

CROSS-REFERENCE TO RELATED APPLICATIONS

The present invention is related to "METHOD AND APPARATUS FOR AN INTEGRATED LASER BEAM SCANNER USING A CARRIER SUBSTRATE" by Floyd, Sun and Kubby (Attorney Docket No. D/98707), Ser. No. 09/203,442, filed on the same day and assigned to the same assignee which is hereby incorporated by reference in its entirety.

BACKGROUND AND SUMMARY OF INVENTION

The present invention relates generally to the field of laser beam scanning systems, and more particularly to micro-electro-mechanical systems (MEMS) for laser beam scanning. Miniature laser beam scanning systems are important for applications such as barcode scanning, machine vision and, most importantly, xerographic printing. The use of MEMS to replace standard raster output scanning (ROS) in xerographic print engines allows simplification of printing systems by eliminating macroscopic mechanical components and replacing them with large arrays of scanning elements. Advanced computation and control algorithms are used in managing the large arrays of scanning elements.

Such MEMS based printing systems are entirely solid state, reducing complexity, and allowing increased functionality, including compensation of errors or failures in the scanner elements. An important step in constructing solid state scanning systems is integrating the semiconductor light emitter directly with MEMS actuators to gain the desired optical system simplification. Integrated scanners, which have lasers and scanning mirrors in the same structure, have been demonstrated using manual placement of laser chips onto MEMS wafers with micromachined alignment parts and adhesives by L. Y. Lin et al in Applied Physics Letters, 66, p. 2946, 1995 and by M. J. Daneman et al in Photonics Technology Letters, 8(3), p. 396, 1996. However, current techniques do not allow wafer-scale integration of the light-emitter and MEMS device.

In accordance with the present invention a laser beam scanner consisting of a single crystal silicon (SCS) deflection and scanning mirror is integrated with a laser diode or light emitting diode. By combining methods of deep reactive ion etching (deep RIE) of silicon with solder bump bonding methods, completed and tested laser diodes are integrated with silicon (Si) or silicon on insulator (SOI) substrates supporting MEMS layers. Details of creating a torsional mirror and actuating it magnetically or electrostatically are detailed in U.S. Pat. No. 5,629,790 by Neukermans and Slater which is incorporated herein by reference in its entirety.

Using solder bump bonding methods, completed and tested laser diodes are bonded to silicon MEMS built using a typical surface and bulk micromachining processes. Because of the deep RIE recesses, the laser diode solder bumps can be passively aligned to those on the host substrate. In addition, the deep RIE recesses allow nearly coplanar laser chip and Si surfaces to be made. The use of the SCS layer of an SOI wafer, rather than the polysilicon film provides for the introduction of very flat and smooth mirrors and high reliability torsion bars. The device is easily scalable to arrays of lasers and scanning mirrors on a single wafer.

Integration of the scanner and light source eliminates the need for external, manual positioning of light sources and scanning mirrors. Simplified and more cost effective post-processing steps such as interconnect metallization can be realized because the use of an etched recess results in nearly planar surfaces. In addition, pick and place technologies commonly used for multi-chip module assembly can be adapted for wafer scale assembly and bonding of light sources to the carrier substrate. With such commercial systems, bare die can be placed with accuracy better than ±30 $\mu$m.

Thus, the present invention allows the integration of completed and tested light emitting devices directly with the MEMS actuators to gain the desired simplification of the optical system needed to realize solid state scanning systems.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION

Figure 1:
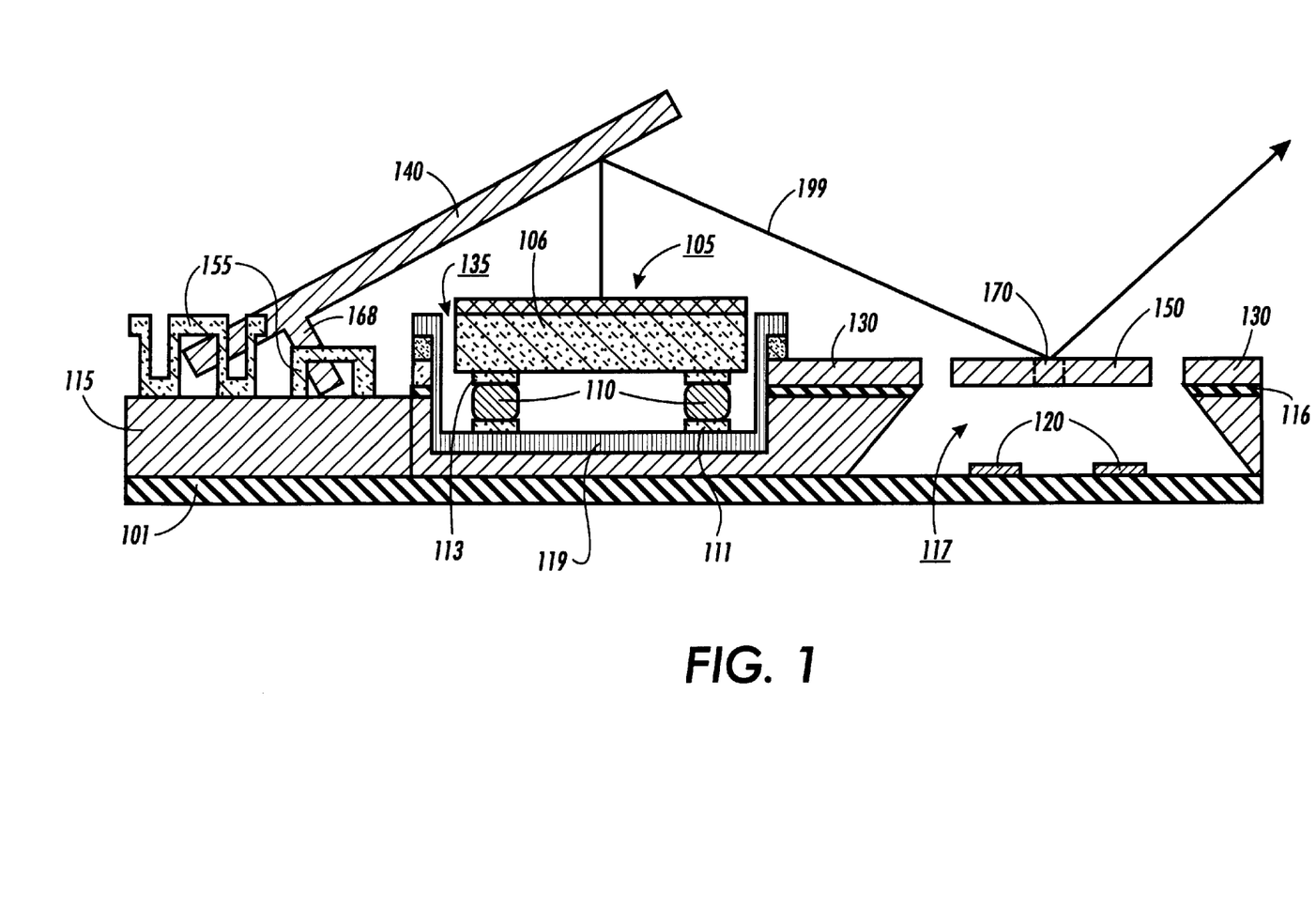
FIG. 1 shows an embodiment in accordance with this invention of an integrated solid state scanner and laser.

An embodiment in accordance with this invention is shown in FIG. 1. A laser beam scanner consisting of a single crystal silicon (SCS) deflecting mirror 140 and torsional mirror 150 is integrated with laser diode or light emitting diode 105. By combining methods of deep reactive ion etching (deep RIE) of silicon with solder bump bonding methods, completed and tested laser diodes 105 are integrated with silicon (Si) or silicon on insulator (SOI) substrates 100 supporting MEMS layers. For example, completed GaAs-based lasers may be joined to Si MEMS to make laser beam scanners in accordance with this invention.

Electrical contact to laser 105 can be made in a variety of ways. Contact can be made by planar surface metallization, by wire bonding to the laser, through the polysilicon layer with solder bumps or some combination of each. Using solder bump bonding methods, completed and tested lasers 105 are bonded to layer phosphorus-doped glass (PSG) layer 119 in recess 135. Deep RIE etching may be used to define recess 135 in the MEMS surface layers 130 and Si substrate 115 for subsequent laser chip 105 placement. Because of deep RIE recess 135, laser diode solder bumps 110 can be passively aligned to wettable metal bonding pads 111 on substrate 115. In addition, deep RIE recess 135 allows for nearly coplanar laser chip 105 and Si surfaces. This allows simplification of the subsequent metallization steps and laser chip 105 does not interfere with the space used for the optical path. The use of SCS layer 130 of SOI wafer 100 for the mirror material, rather than polysilicon film provides for the introduction of very flat and smooth mirrors 140 and 150 and high reliability torsion bars 170. The device is easily scalable to arrays of lasers and scanning mirrors. The reflective surface of deflecting mirror 140 and torsional mirror 150 is typically coated with aluminum 430 (see FIGS. 4e–4m).

In FIG. 1, MEMS components such as single crystalline silicon (SCS) mirror 140 and torsional mirror 150 are formed in SCS layer 130 by using a combination of well-known surface and bulk micro-machining techniques. VCSEL (vertical cavity surface emitting laser) 105 is solder bump 110 bonded to wettable metal bonding pads 111 residing on phosphorus-doped glass (PSG) layer 119. Additionally, actuation electrodes 120 are formed on glass or $SiO_2$ coated silicon substrate 101 which is bonded to SCS substrate 115 after etching hole 117 (see FIG. 4a). Typical thicknesses are 0.5 mm for SCS substrate 115 and glass or dielectric-coated (typically $SiO_2$ or $SiN_x$) Si substrate 101. SCS substrate 115 has deep RIE and/or wet etched recess 135 for alignment and placement of VCSEL 105 on SCS layer 130. VCSEL 105 typically has a divergence angle of about 14 degrees. Emitted light 199 then passes onto deflecting mirror 140 which reflects emitted light 199 onto torsional mirror 150. SCS layer 130 is typically about 2–20 $\mu$m thick. The spot diameter of emitted light 199 at deflecting mirror 140 is typically about 234 $\mu$m and the spot diameter at torsional mirror 150 is typically about 480 $\mu$m.

Polysilicon hinge 155 is micromachined from a deposited polysilicon layer and attaches deflecting mirror 140 to SOI substrate 115. Polysilicon hinge 155 allows deflecting mirror 140 to rotate clockwise about an axis perpendicular to the plane of FIG. 1, out of SCS layer 130 to a typical angle of about 30 degrees above recess 135 as shown in FIG. 1. The distance between polysilicon hinge 155 and torsional mirror 150 is typically on the order of 1.1 mm. A typical length for deflecting mirror 140 is about 1 mm. Deflecting mirror 140 can be supported by support latch 168 controlled by a spring and latch assembly (not shown) in the manner described by Lin et al. in Photonics Technology Letters, 6(12), p. 1445, 1994 and incorporated herein by reference in its entirety. Typically, the length of support latch 168 is 100 $\mu$m. Controlling the position and length of support latch 168 allows the angle of deflecting mirror 140 with respect to SCS layer 130 to be precisely fixed, at for example, 30 degrees in the embodiment shown in FIG. 1. Torsional mirror 150 is electrostatically actuated by actuation electrodes 120 to perform, for example, an optical scan.

Figure 2:
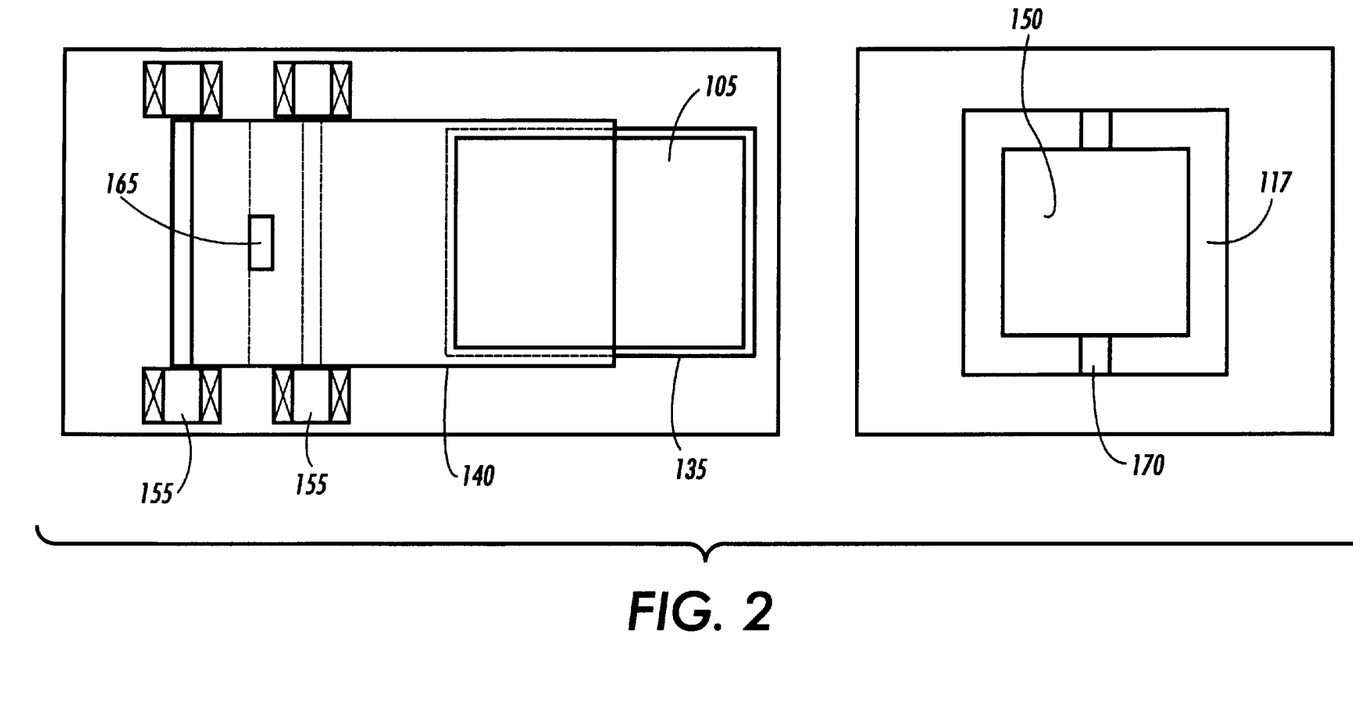
FIG. 2 shows a top view of an embodiment in accordance with this invention.

FIG. 2 shows a top view of one combination deflection mirror/torsional mirror solid state element. Hinge 155 and deflecting mirror 140 is shown along with hole 165 to receive the tab (not shown) on support latch 168. The layout of torsional mirror 150 supported by torsion bar 170 with respect to hole 117 is also shown.

Figure 3A:
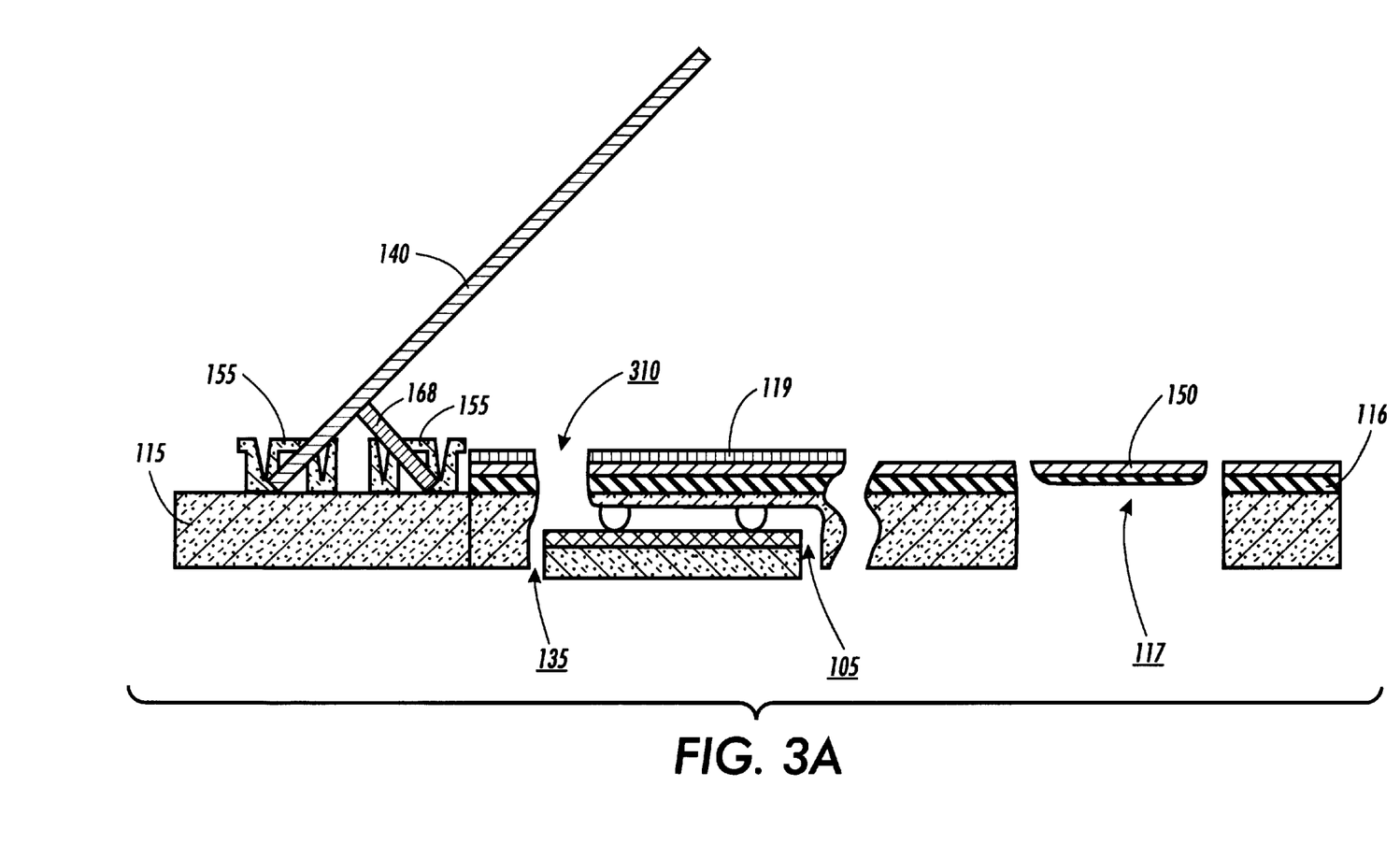
FIGS. 3a–3c show alternative embodiments in accordance with this invention of an integrated solid state scanner and laser.

FIG. 3a shows an alternative embodiment in accordance with the present invention which requires via 310 for laser beam 199. Via 310 has a cross-sectional area much smaller than that of VCSEL 105. This preserves SCS layer 130 and other MEMS layers opposite VCSEL 105 for potential use in forming MEMS devices. In the embodiment in FIG. 3a, alignment recess 135 is on the back side of wafer 100, opposite the surface MEMS layers. VCSEL chip 105 is solder bump bonded to wettable metal bonding pads 111 on PSG layer 119 on wafer 115. Light passes through aperture 310 formed by wet etching and/or deep RIE. Torsional mirror 150 is electrostatically actuated by actuation electrodes 120 to perform, for example, an optical scan.

Figure 3B:
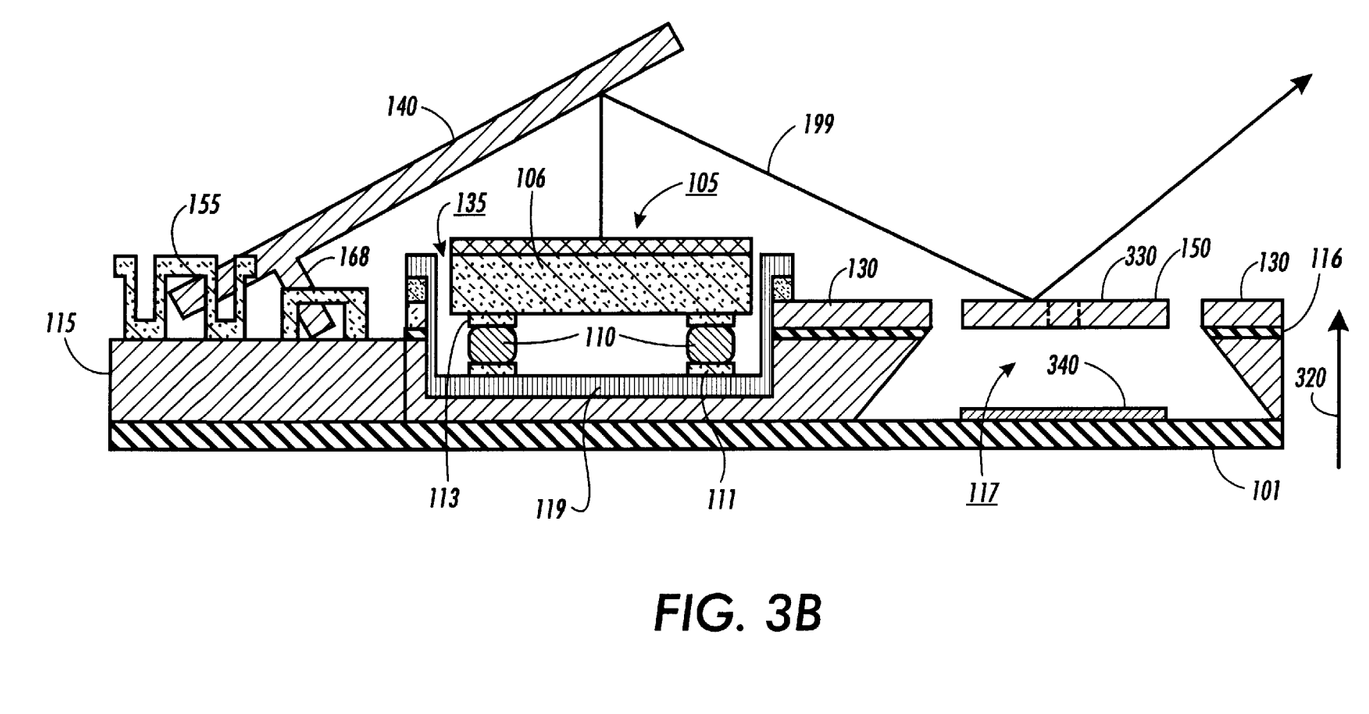

FIG. 3b shows an alternative embodiment in accordance with the present invention similar to that shown in FIG. 1. However, the embodiment shown in FIG. 3b has ferromagnetic thin film 330 deposited on torsional mirror 150 and thin film coil 340 deposited on glass or $SiO_2$ coated Si substrate 101. Magnetization of ferromagnetic thin film 330 is in the plane of torsional mirror 150 so that magnetic field 320 generated by thin film coil 340 will actuate torsional mirror 150.

Figure 3C:
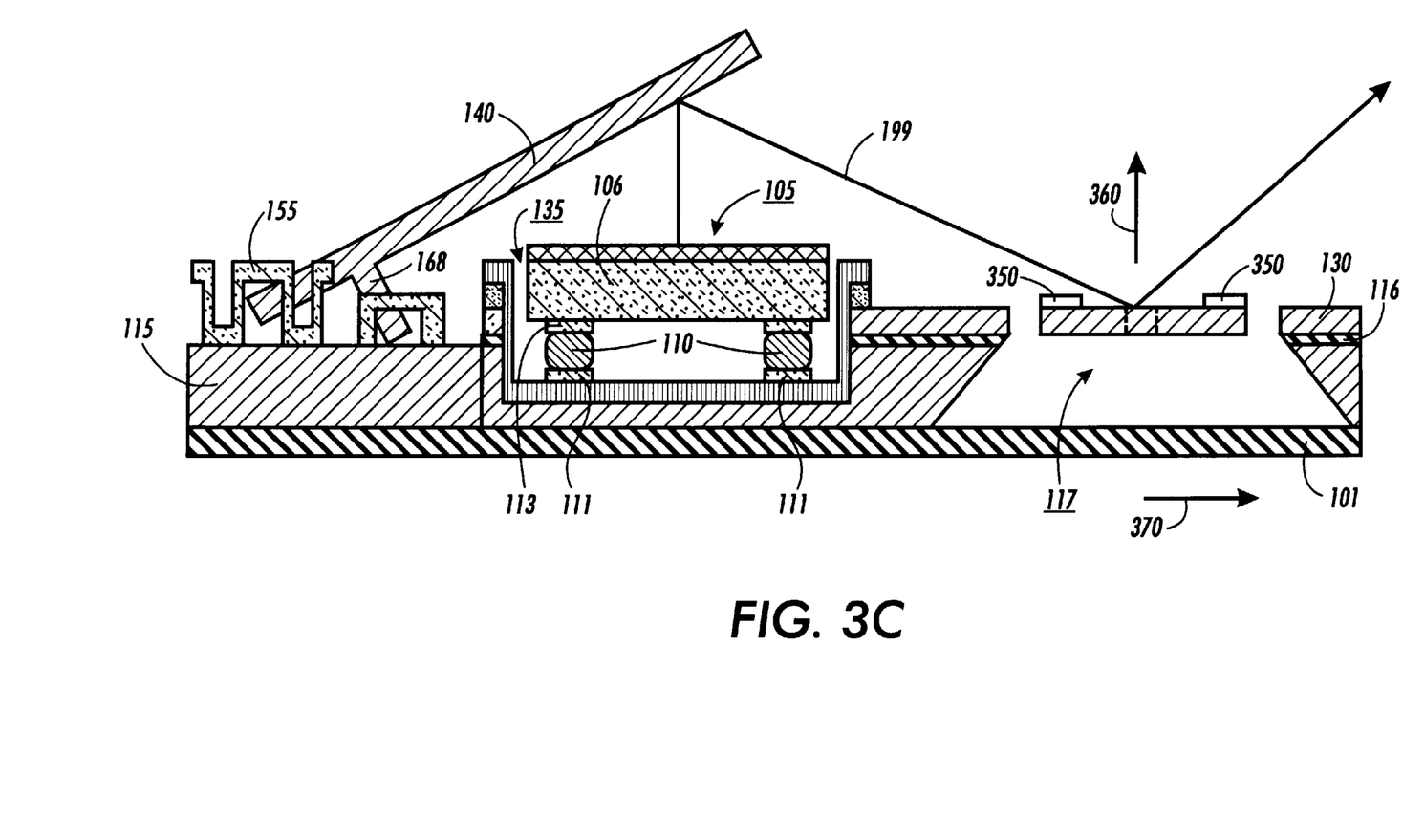

FIG. 3c shows an alternative embodiment in accordance with the present invention similar to that shown in FIG. 1. However, the embodiment shown in FIG. 3c has microfabricated metal thin film coil 350 with a diameter approximately that of torsional mirror 150 deposited on torsional mirror 150. Metal thin film coil 350 generates magnetic field 360 (shown for counterclockwise current flow in thin film coil 350) perpendicular to torsional mirror 150 when current is passed through thin film coil 350. Additionally, external magnetic field 370 parallel to torsional mirror 150 is present. Depending on the direction of the current flow in thin film coil 350, torsional mirror 150 will rotate to the left or to the right in FIG. 3c to minimize the misalignment between magnetic field 360 and magnetic field 370.

Figure 4A:
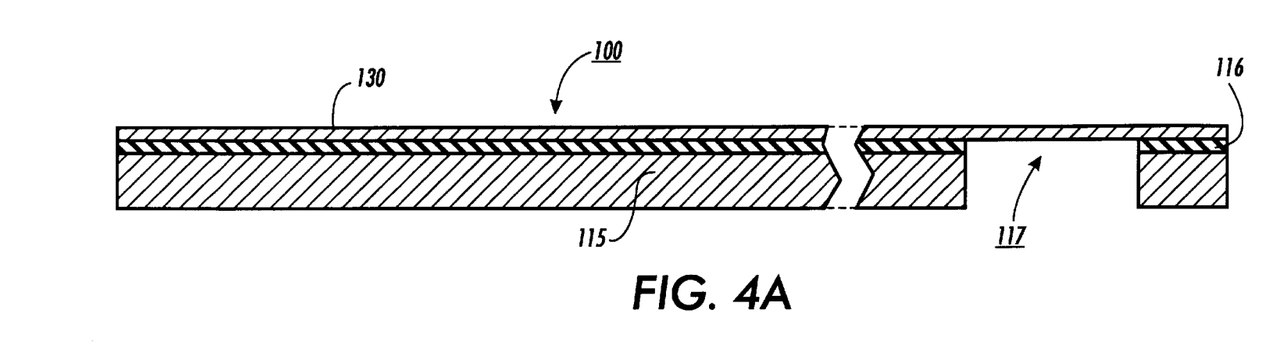
FIGS. 4a–4n show the processing steps for constructing an embodiment in accordance with this invention.
Figure 4B:
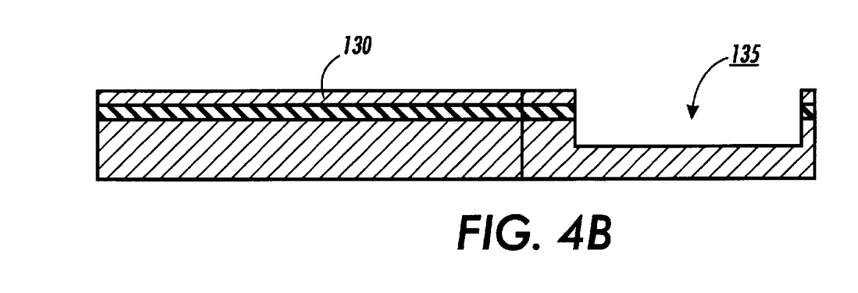
Figure 4C:
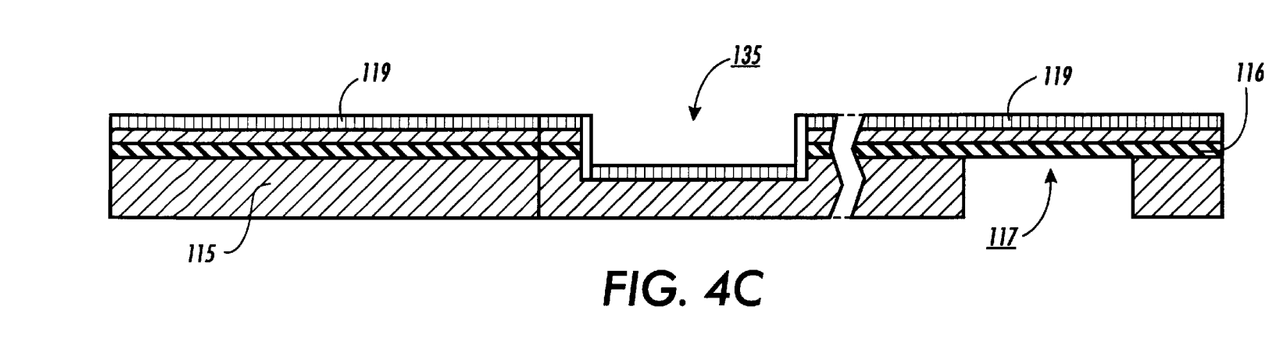

Steps for fabricating deflecting mirror, supporting latch and VCSEL in accordance with this invention are shown in FIGS. 4a–4j. The starting material used as a substrate is typically a silicon on insulator (SOI) wafer. Such silicon wafers are commercially available from several manufacturers such as Bondtronix, Inc. of Alamo, Calif. and Ibis Technology Corporation of Danvers, Mass. Typically, the thickness of SCS layer 130 is chosen to be 2–20 $\mu$m depending on the stiffness that is required of the torsional spring elements and the mirror surfaces to be constructed from MEMS layer 130. Other mechanical layers are deposited on top of SOI wafer 100 by well-known methods such as Low Pressure Chemical Vapor Deposition (LPCVD). The deposited layers are mechanical layers of polycrystalline silicon (poly) and a sacrificial oxide layer that is phosphorus-doped glass (PSG). Aluminum can be deposited by sputtering or thermal evaporation. FIG. 4c shows PSG layer 119 of 1–2 $\mu$m thickness directly on top of MEMS layer 130 of SOI wafer 100.

Figure 4D:
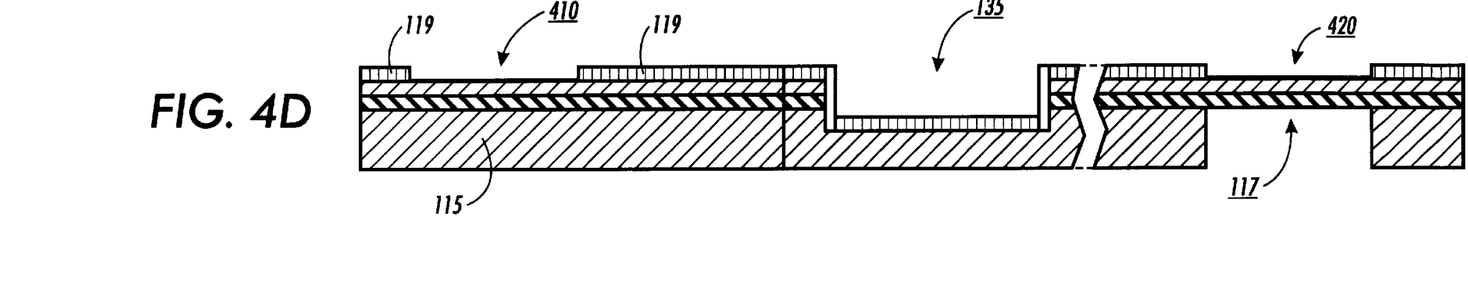
Figure 4E:
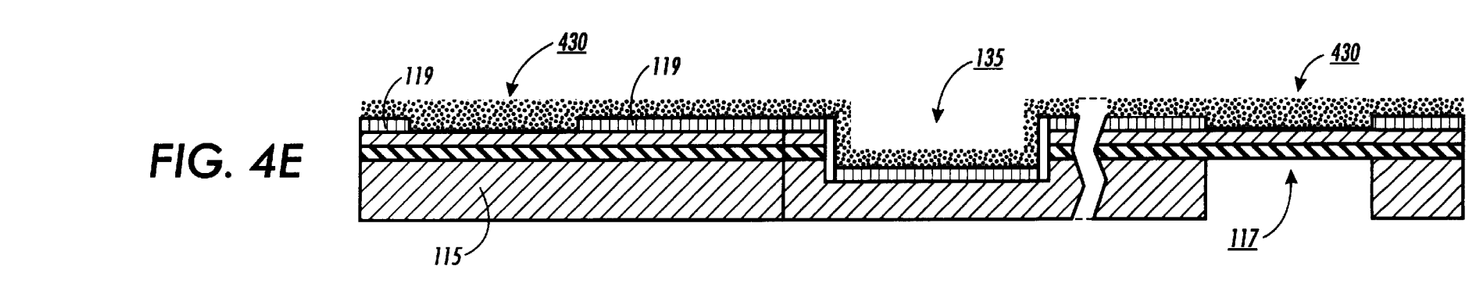
Figure 4F:
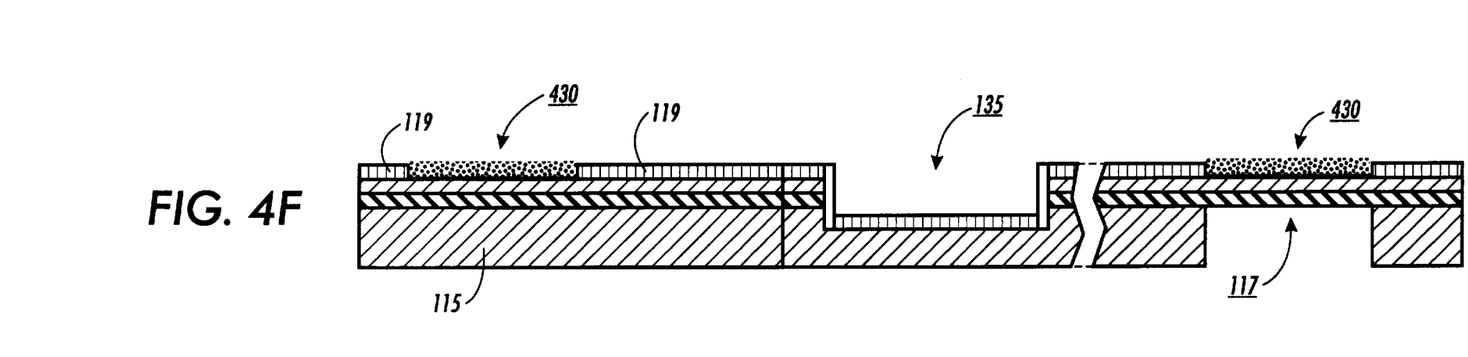
Figure 4G:
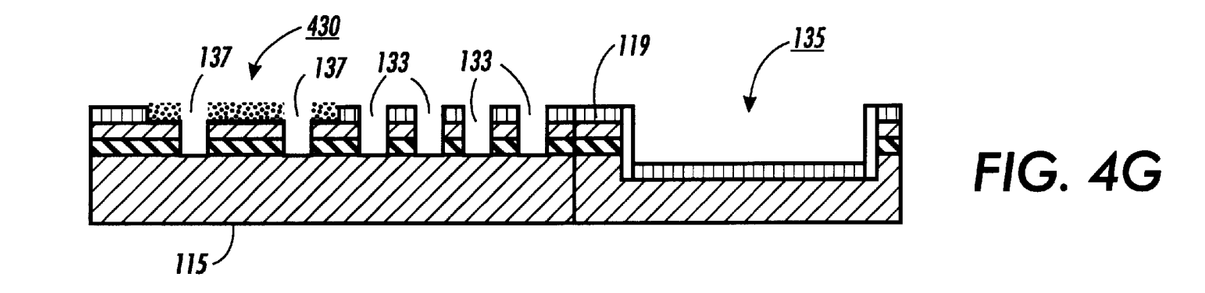
Figure 4H:
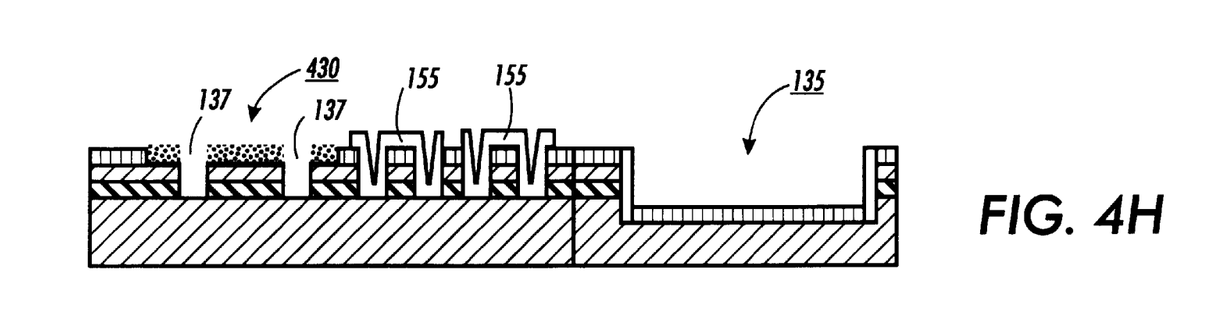
Figure 4I:
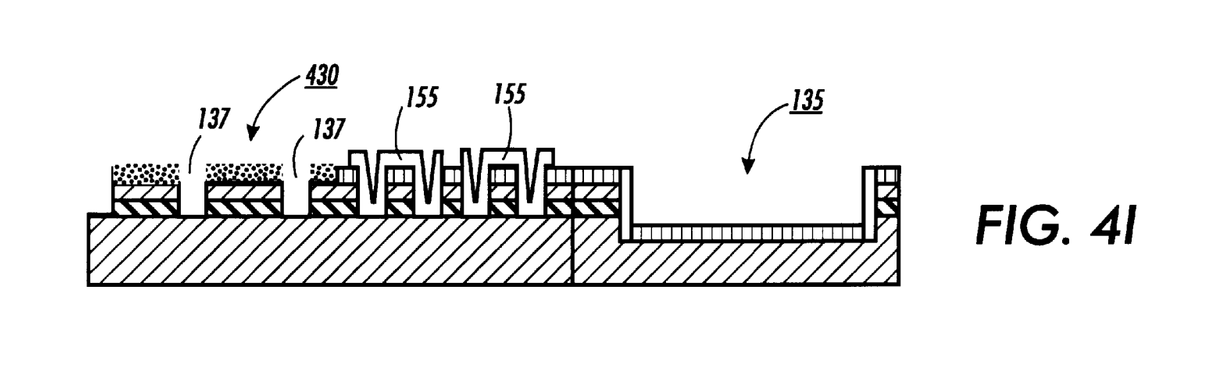
Figure 4J:
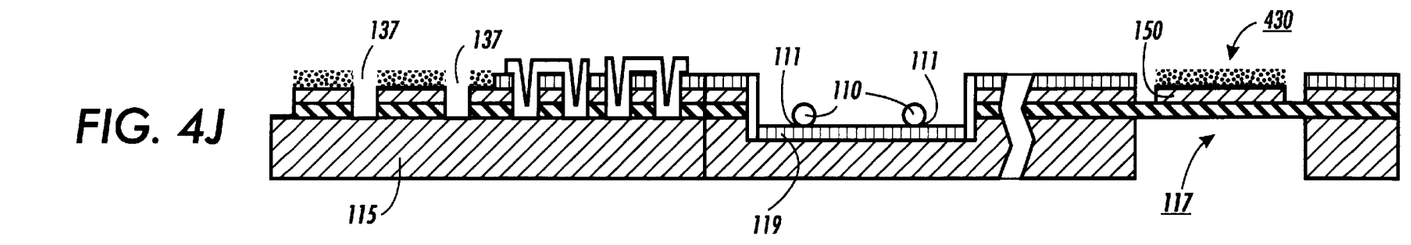
Figure 4K:
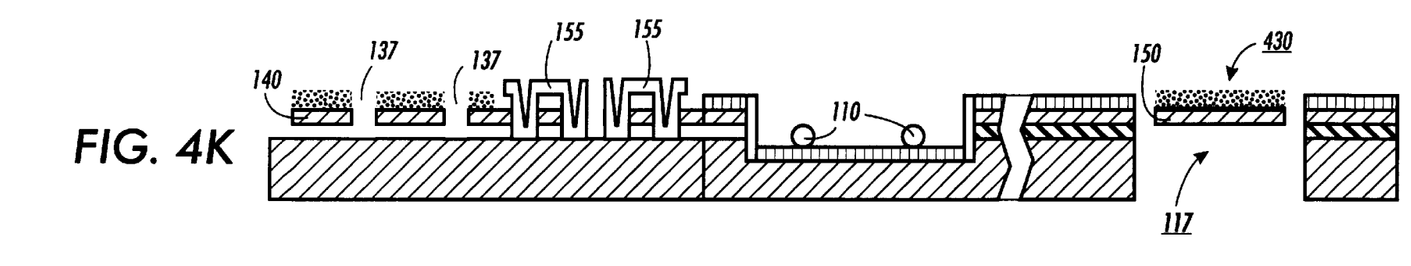
Figure 4M:
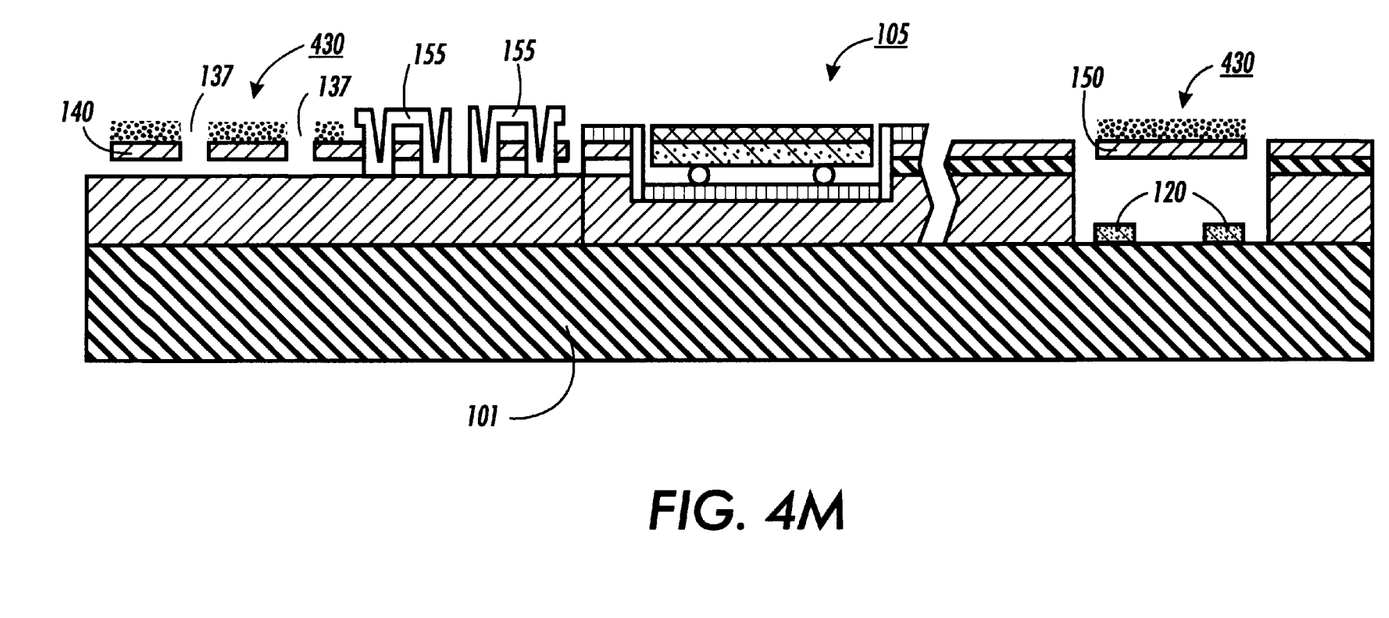
Figure 4N:
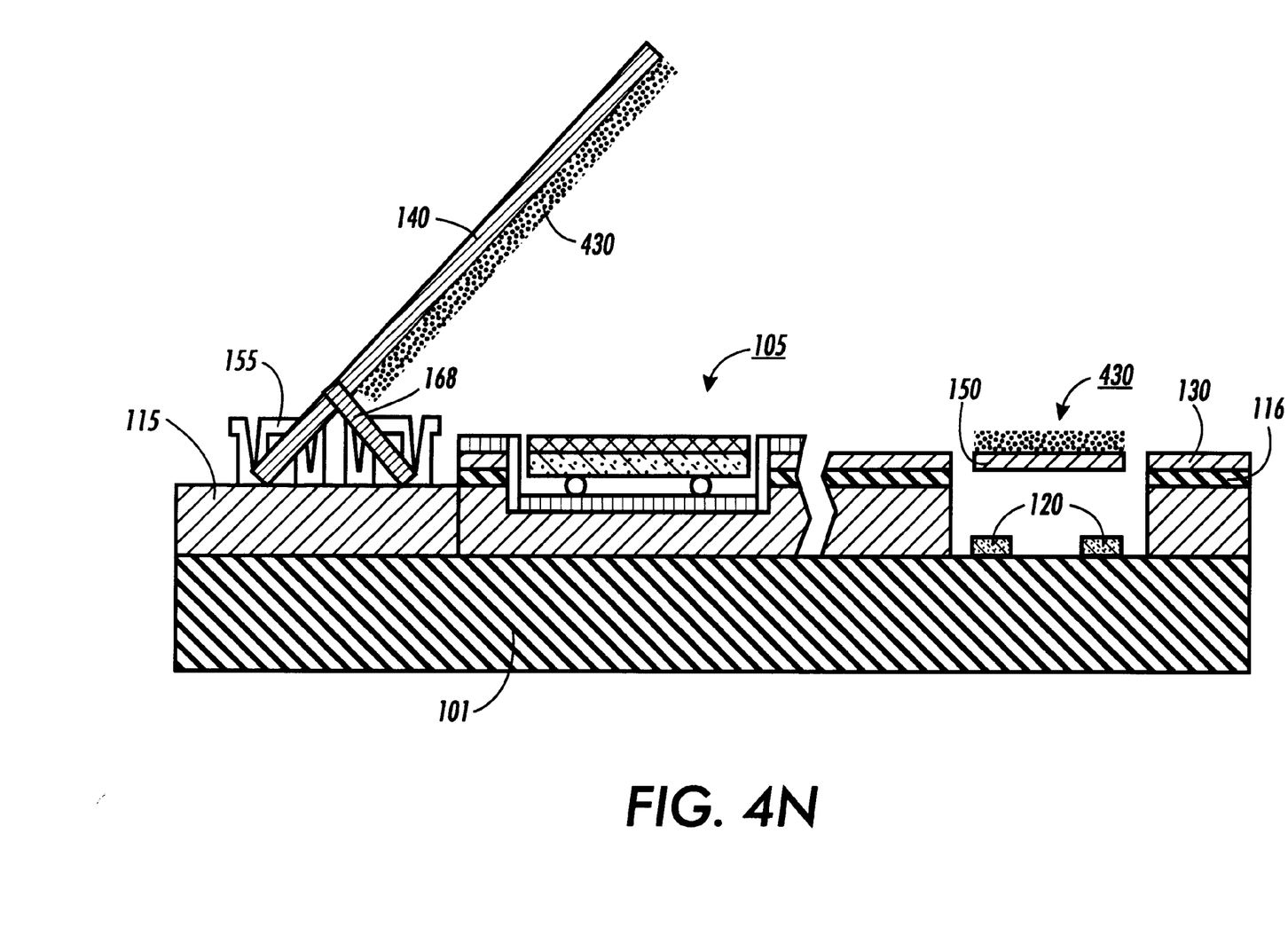

FIGS. 4a–n show the processing steps used to fabricate deflecting mirror 140, supporting latch 168 and VCSEL 105 in an embodiment in accordance with this invention. Supporting latch 168 has a tab (not shown) which inserts into corresponding hole 165 (see FIG. 2) in deflecting mirror 140. Deflecting mirror 140 and supporting latch 168 are defined by reactive ion etching (RIE) using $CF_4$ with 4–10 percent $O_2$ during the etching steps. The completed deflecting mirror 140 and supporting latch 168 configuration is shown in FIG. 4n. The typical size of deflecting mirror 140 is in the range of 0.5–1.0 mm square.

FIG. 4a has $SiN_x$ layer (not shown) deposited on SOI wafer 100 by LPCVD. $SiN_x$ layer is patterned using $CF_4/O_2$ RIE with a photoresist mask to form a mask for KOH (potassium hydroxide) etching of Si. KOH etching is used to etch hole 117 from the bottom of SOI wafer 100, stopping on insulator layer 116 of SOI wafer 100. The dimensions of etched hole 117 will be comparable to that of torsional mirror 150 to allow free rotation of torsional mirror 150. Alternatively etched hole 117 may be defined by deep RIE using $C_4F_8$ and $SF_6$ with a $SiN_x$ or photoresist mask.

FIG. 4b shows SOI wafer 100 with recess 135 (200–250 $\mu$m deep) etched into SOI wafer 100 using a combination of $CF_4/O_2$ RIE for MEMS layer 130 and insulator layer 116 and deep RIE using $C_4F_8$ and $SF_6$ in substrate 115.

FIG. 4c shows chemical vapor deposition (CVD) of phosphorus-doped glass (PSG) 119.

FIG. 4d shows a wet etch using hydrofluoric acid of windows 410 and 420 in PSG layer 119.

FIG. 4e shows deposition of aluminum film 430 (0.1–0.2 μm) as a high reflectivity layer.

FIG. 4f shows a wet etch (typically a mixture of phosphoric and nitric acid) Al to leave Al in mirror regions.

FIG. 4g shows etching of vias 133 to Si substrate 115 using $CF_4/O_2$ RIE with a photoresist mask.

FIG. 4h shows the deposited polysilicon layer of 1–2 μm thickness after being patterned to form hinge 155 for deflecting mirror 140. Patterning of polysilicon hinges 155 is described in Wu, "Micromachining for Optical and Optoelectronic Systems", Proceedings of IEEE, vol. 85, p.1833, 1997 and Pister et al., "Microfabricated hinges", Sensors and Actuators, A: Physica v 33 n 3 p. 249–256, 1992 which are hereby incorporated by reference in their entirety. If the RIE etching step is done before deposition of the polysilicon layer, the polysilicon can be deposited in etched recess 135 to reduce surface roughness due to the etching.

FIG. 4i shows the etch of PSG layer 119 and SCS layer 130 to pattern deflecting mirror 140, hinge 155 and access holes 137. Holes 137 allow for the etchant used to release deflecting mirror 140 to reach insulating layer 116. A typical size for holes 137 is 10 μm by 10 μm. Torsional mirror 150 is also defined in this step. Typical size for torsional mirror 150 in accordance with this invention is in the range of 1–2 mm square.

FIG. 4j shows the Ti—Au deposition of wettable metal bonding pads 111 and solder for solder bumps 110. Solder is reflowed into solder bumps 110 by heating at temperatures<310° C. This leaves the finished, unreleased MEMS parts, along with precisely defined recess 135, ready for the GaAs bonding step in FIG. 4.

FIG. 4k shows release of deflecting mirror 140 and hinge 155 by etching PSG layer 119 and insulator layer 116 by using a hydrofluoric (HF) based etch.

FIG. 4l shows placement of VCSEL 105 (thickness from 100–125 μm) into recess 135 for the GaAs bonding step. Solder bumps 110 can be defined on VCSEL 105 and VCSEL 105 is placed into recess 135 which approximately aligns the bumps to wettable metal bonding pads 111 and 113 due to the coordinated geometry of VCSEL 105, recess 135, wettable metal bonding pad 111 and solder bump 110 positions. Si Substrate 115 and VCSEL substrate 106 are heated to allow solder to flow and contact wettable metal bonding pads 113 on the bottom of VCSEL substrate 106.

FIG. 4m shows hinges 155, deflecting mirror 140, torsional mirror 150 and VCSEL 105 bonded to glass substrate 101 or to $SiN_x$-coated or $SiO_2$-coated Si substrate 101. Substrate 101 supports actuation electrodes 120 for torsional mirror 150.

FIG. 4n shows raised deflecting mirror 140 locked with latch 168. Angle of deflecting mirror 140 is fixed by the length of latch 168 and position of hole 165 at base of deflecting mirror 140.

Linear arrays of lasers can be bonded in a similar way; the extent of the array being perpendicular to the cross section shown in FIGS. 3a and 3b.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. An integrated laser beam scanning structure comprising:
   a wafer having a recess on a side;
   a layer having a first region and a second region, said layer being attached to said side of said wafer having said recess;
   a deflecting mirror fashioned from said first region of said layer;
   a torsional mirror fashioned from said second region of said layer, said torsional mirror having a first side; and
   a semiconductor light emitter mounted in said recess whereby a light beam emitted from said semiconductor light emitter is deflected by said deflecting mirror onto said first side of said torsional mirror.

2. The structure of claim 1 wherein said wafer is a silicon on oxide wafer.

3. The structure of claim 1 wherein said layer is a single crystal silicon layer.

4. The structure of claim 1 wherein said semiconductor light emitter is mounted in said recess using solder bumps.

5. The structure of claim 1 wherein said semiconductor light emitter is a VCSEL chip.

6. The structure of claim 1 wherein said recess is deep reactive ion etched.

7. The structure of claim 1 wherein said torsional mirror is actuated by a pair of electrodes.

8. The structure of claim 1 wherein a ferromagnetic thin film is attached to said first side of said torsional mirror.

9. The structure of claim 8 wherein said torsional mirror is actuated by a thin film coil.

10. The structure of claim 1 wherein a thin film coil is attached to said first side of said torsional mirror.

11. A method for making an integrated laser beam scanner comprising the steps of:
    providing a wafer having a recess on a side;
    attaching a layer having a first region and a second region to said side of said wafer having said recess;
    fashioning a deflecting mirror from said first region of said layer;
    fashioning a torsional mirror from said second region of said layer, said torsional mirror having a first side; and
    mounting a semiconductor light emitter in said recess such that a light beam emitted from said semiconductor light emitter is deflected by said deflecting mirror onto said first side of said torsional mirror.

12. The method of claim 11 wherein said wafer is a silicon on oxide wafer.

13. The method of claim 11 wherein said layer is a single crystalline silicon layer.

14. The method of claim 11 wherein said semiconductor light emitter is mounted in said recess using solder bumps.

15. The method of claim 11 wherein said semiconductor light emftter is a VCSEL chip.

16. The method of claim 11 wherein said recess is deep reactive ion etched.

17. The method of claim 11 wherein said torsional mirror is actuated by a pair of electrodes.

18. The method of claim 11 wherein said torsional mirror is actuated by a thin film coil and an external magnetic field.

19. The method of claim 11 wherein a ferromagnetic thin film is attached to said first side of said torsional mirror.

20. The method of claim 11 wherein a thin film coil is attached to said first side of said torsional mirror.

* * * * *